(12) United States Patent
Roselund et al.

(10) Patent No.: US 12,420,723 B2
(45) Date of Patent: Sep. 23, 2025

(54) BRACKET ADAPTED TO BE MOUNTED TO A PANE OF A MOTOR VEHICLE

(71) Applicant: Veoneer Sweden AB, Värgärda (SE)

(72) Inventors: Erik Roselund, Linköping (SE); Gustav Alm, Linköping (SE)

(73) Assignee: Magna Electronics Sweden AB, Vårgårda (SE)

( * ) Notice: Subject to any disclaimer, the term of this patent is extended or adjusted under 35 U.S.C. 154(b) by 119 days.

(21) Appl. No.: 18/560,706

(22) PCT Filed: May 16, 2022

(86) PCT No.: PCT/EP2022/063175
§ 371 (c)(1),
(2) Date: Nov. 14, 2023

(87) PCT Pub. No.: WO2022/243239
PCT Pub. Date: Nov. 24, 2022

(65) Prior Publication Data
US 2024/0278735 A1 Aug. 22, 2024

(30) Foreign Application Priority Data
May 19, 2021 (EP) .................................. 21174740

(51) Int. Cl.
*B60R 11/04* (2006.01)
*B60R 11/00* (2006.01)
*G03B 17/56* (2021.01)

(52) U.S. Cl.
CPC ............ *B60R 11/04* (2013.01); *G03B 17/561* (2013.01); *B60R 2011/0026* (2013.01)

(58) Field of Classification Search
CPC .................. G03B 17/561; B60R 11/04; B60R 2011/0026
See application file for complete search history.

(56) References Cited

U.S. PATENT DOCUMENTS 9,541,990 B2 1/2017 Suzuki et al.
9,971,731 B2 5/2018 Suzuki et al.
(Continued)

FOREIGN PATENT DOCUMENTS

EP 3461689 A1 4/2019
EP 3566907 A1 11/2019

OTHER PUBLICATIONS

International Search Report and Written Opinion of PCT/EP2022/063175, mailed Sep. 1, 2022.

*Primary Examiner* — Daniel M Pasiewicz
(74) *Attorney, Agent, or Firm* — DICKINSON WRIGHT PLLC

(57) ABSTRACT

A bracket (10) adapted to be mounted to a pane of a motor vehicle including a base part (11) and at least one fixation arrangement (12a, 12b, 12c) configured to mount a camera carrier (35) carrying at least one camera (14) to the bracket (10). Each of the fixation arrangements (12a, 12b, 12c)- including a holder (13a, 13b, 13c) and a spring element (15) configured to exert an elastic locking force on a pin (19) of the camera carrier (35). The spring element (15) includes a base element (17) configured to be held in the holder (13) and an angled leg (16) in the region of a first end (44) of the base element (17). The holder (13a, 13b, 13c) forms a hole (18) configured to receive the angled leg (16) in a mounted state, wherein in the mounted state the hole (18) limits the movement of the angled leg (16) and thus of the spring element (15) in both longitudinal directions of the elongate base element (17).

14 Claims, 4 Drawing Sheets

(56) References Cited

U.S. PATENT DOCUMENTS

| | | |
|---|---|---|
| 10,081,310 B2 | 9/2018 | Kasai et al. |
| 10,394,749 B2 | 8/2019 | Suzuki et al. |
| 10,556,551 B2 | 2/2020 | Krug et al. |
| 10,596,981 B2 | 3/2020 | Granholm |
| 10,921,166 B2 | 2/2021 | Matori |
| 11,036,671 B2 | 6/2021 | Suzuki et al. |
| 2016/0314092 A1 | 10/2016 | Suzuki et al. |
| 2017/0199840 A1 | 7/2017 | Suzuki et al. |
| 2017/0240120 A1* | 8/2017 | Krug ............... F16M 13/02 |
| 2017/0274834 A1 | 9/2017 | Kasai et al. |
| 2018/0276179 A1 | 9/2018 | Suzuki et al. |
| 2018/0364076 A1 | 12/2018 | Matori |
| 2019/0344726 A1 | 11/2019 | Granholm |
| 2019/0391953 A1 | 12/2019 | Suzuki et al. |
| 2020/0384930 A1* | 12/2020 | Singh ............... B60R 11/04 |
| 2021/0178985 A1* | 6/2021 | Takeda ............. B60R 11/00 |
| 2021/0284082 A1* | 9/2021 | Tokito ............. H04N 23/54 |
| 2022/0281391 A1* | 9/2022 | Grasun ............. B60R 11/04 |

* cited by examiner

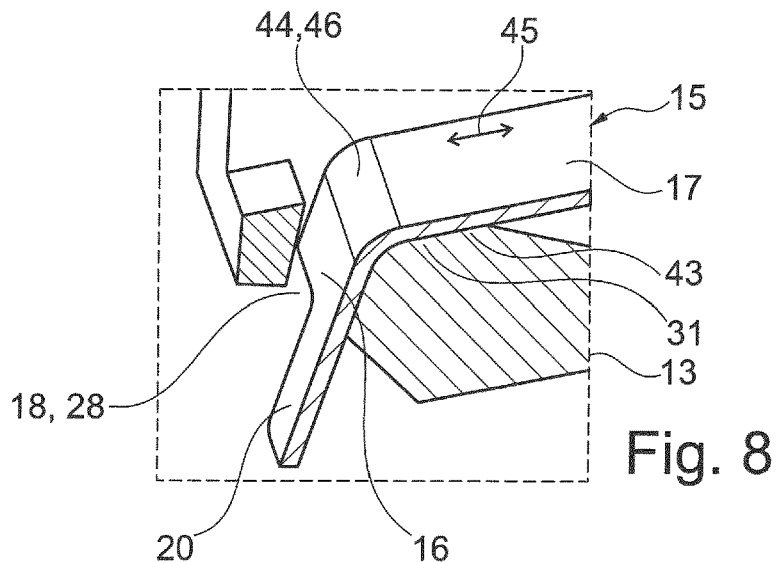
Fig. 8
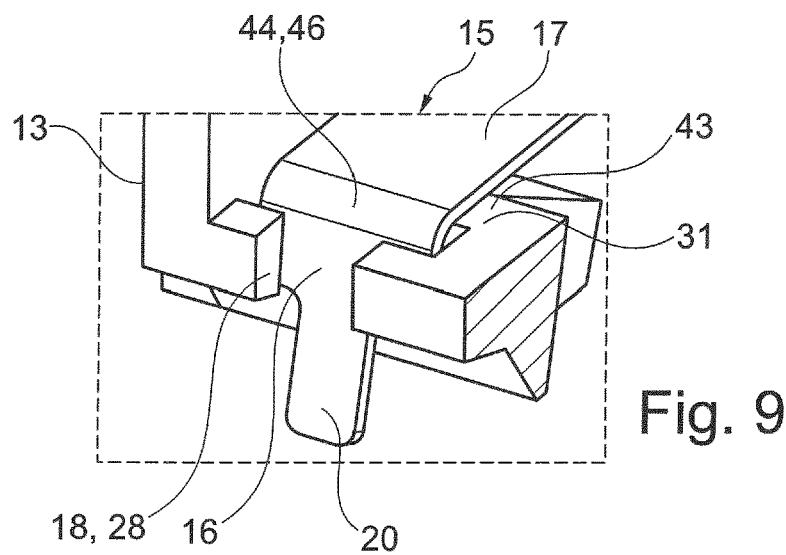
Fig. 9
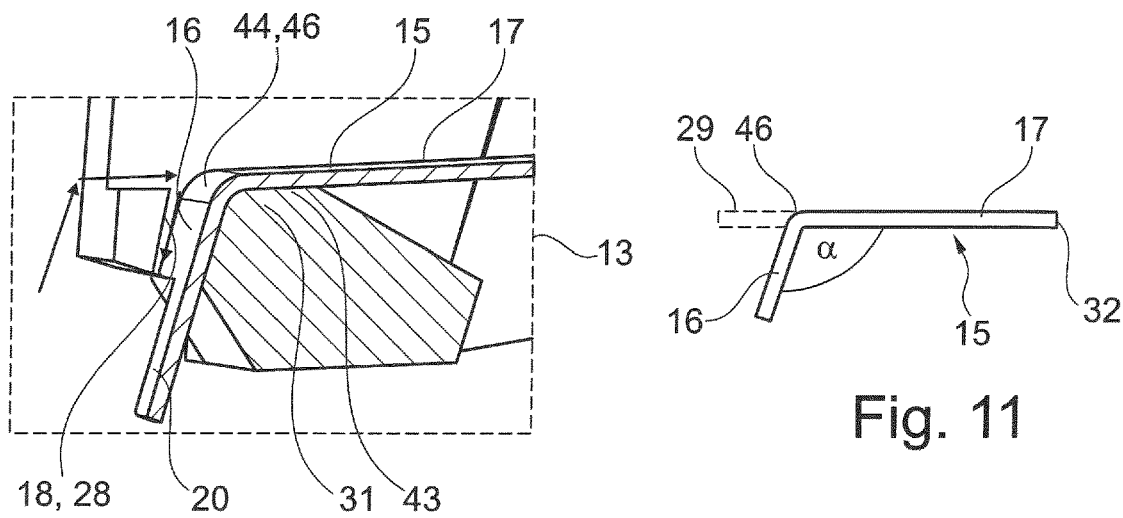
Fig. 10
Fig. 11

BRACKET ADAPTED TO BE MOUNTED TO A PANE OF A MOTOR VEHICLE

CROSS-REFERENCE TO RELATED APPLICATIONS

This application is a 35 U.S.C. § 371 national phase of PCT International Application No. PCT/EP2022/063175, filed May 16, 2022, which claims the benefit of priority under 35 U.S.C. § 119 to European Patent Application No. 21174740.7, filed May 19, 2021, the contents of which are incorporated herein by reference in its entirety.

FIELD OF THE INVENTION

The invention relates to a bracket adapted to be mounted to a glass pane of a motor vehicle, the bracket comprising a base part and at least one fixation arrangement configured to mount a camera carrier carrying at least one camera to the bracket, wherein each of the at least one fixation arrangement comprises a holder and a spring element, wherein the spring element comprises a base element configured to exert an elastic locking force on a pin of the camera carrier, wherein the spring element comprises a base element configured to be held in the holder, wherein the spring element comprises an angled leg in the region of a first end of the base element.

BACKGROUND

A bracket adapted to be mounted to a glass pane of a motor vehicle and comprising at least one fixation arrangement configured to mount a camera carrier carrying at least one camera to the bracket is known for example from EP 3 566 907 A1. Here, the spring element is a strip having a through hole engaged by a protrusion connected to the base plate of the bracket.

Known designs of the fixation arrangement generally suffer from one or more of the following disadvantages: The retention force exerted on the pin by the spring element is limited and depends on the installation force; therefore, it is not possible to increase the retention force above a certain value because the installation would otherwise become impossible. A relatively long tolerance chain is involved. High forces are needed for engagement and disengagement of a pin in the holder, which makes mounting and dismounting of the camera carrier from the bracket difficult. Additional costs are generated for the time-consuming manual or automated installation of the spring element. A plastic snap fit used for the fixation of the spring element can be sheared by the edge of the spring element sometimes during installation, leading to the possibility of loosing the spring element during transportation to the customer.

The problem underlying the present invention is to provide a bracket to which a camera carrier can be mounted and unmounted with lower forces, while enabling a relatively high retention force exerted by the spring element on a pin of the camera carrier, and having a low tolerance chain.

SUMMARY

The present invention solves the above-described objects with the features described herein. According to the invention, the holder comprises a hole configured to receive the angled leg in a mounted state. In the mounted state the hole limits the movement of the angled leg and thus of the spring element in both longitudinal directions of the elongate base element. This has a significant advantage over solutions where an angled leg is used for limiting the movement of the spring element in one longitudinal direction, only, requiring a separate securing element at an opposite end of the spring element for limiting the movement of the spring element in the other longitudinal direction. The invention requires only one locking feature of the spring element in the form of the angled leg locked in the hole of the holder.

Preferably, the leg forms an angle of at least 95°, preferably at least 100° relative to the base element. A spring element with an angled leg in this angular region is easier to mount and dismount than a 90° angled leg, while still providing a secure locking in the hole of the holder.

The holder preferably comprises a counter element forming a recess for receiving the pin in the mounted state. The counter element is U-shaped in a preferred embodiment, which is easy to manufacture. In a preferred embodiment, the counter element forms a contact surface configured to contact the base element from the side opposite the hole. In this manner, the counter element also serves for holding down the spring element in a desired position.

Preferably, the holder comprises a first support element configured to support the base element in the region of the first end of the base element. In this embodiment, the hole can preferably be formed in the first support element, such that no additional hole forming element is required. Preferably the first end of the base element is a proximal end arranged proximal to an insertion opening of the holder. Furthermore, the holder comprises a second support element configured to support the base element at a second end the base element opposite the first end. The first support element and the second support element support the spring element from below and contribute to keeping the spring element in the desired position.

In a practical embodiment the base element comprises an extension extending in the plane of the base element and forming the first end of the base element. In this case, the extension is preferably U-shaped, wherein the base of the U-shape forms the first end. Other forms of the extension are possible.

In a preferred embodiment, the hole in the holder provided for receiving the angled leg of the spring element is a blind hole.

In one embodiment, the hole in the holder provided for receiving the angled leg of the spring element is a through-hole extending through the holder from an inner hollow space to the outside of the holder. In this embodiment, the angled leg can preferably comprise a handling section protruding over a surface of the holder to the outside thereof. The handling section can facilitate the mounting or dismounting of the spring element from the holder.

BRIEF DESCRIPTION OF THE DRAWINGS

In the following embodiments of the invention shall be illustrated on the basis of preferred embodiments with reference to the accompanying drawings, wherein:

FIGS. 8-10 show perspective views on the fixation arrangement of FIG. 7 in the region of the angled leg of the spring element; and FIG. 11 shows a schematic illustration of a spring element in a side view.

DETAILED DESCRIPTION

Figure 1:
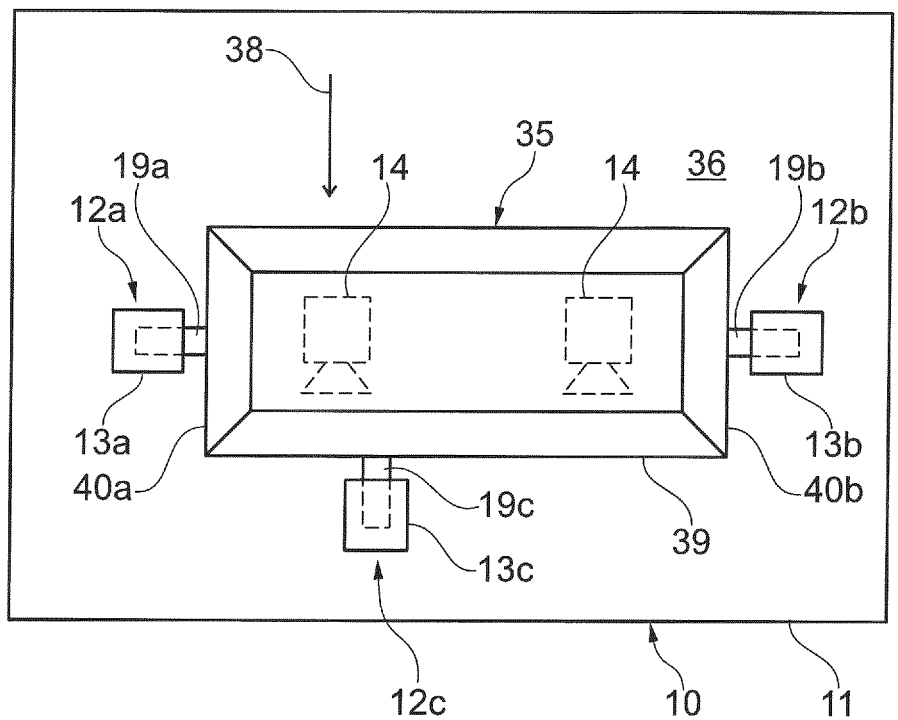
FIG. 1 shows a schematic plane view on the bracket from the side of the vehicle interior.

The bracket 10 shown in FIG. 1 is configured to be mounted to the windshield (not shown) of a motor vehicle. The bracket 10 comprises, at a windshield side 34, a windshield facing surface (not shown) directed to the vehicle windshield, and, at a windshield averted side 37, a windshield averted surface 36 directed to the vehicle interior and arranged opposite the windshield facing surface. The bracket comprises a base part 11, like a base plate, and one or more fixation arrangements 12a, 12b, 12c configured to mount a camera carrier 35 to the bracket 10. In the present embodiment, three fixation arrangements 12a, 12b, 12c are provided. The number of fixation arrangements 12a, 12b, 12c may be different from three.

The camera carrier 35 carries one or more camera units 14 which in the mounted state are positioned and aligned to look through the windshield and capture images from the surrounding of the motor vehicle. The camera carrier 35 comprises one or more pins 19a, 19b, 19c, where the number of pins 19a, 19b, 19c preferably corresponds to the number of fixation arrangements 12a, 12b, 12c, and each pin 19a, 19b, 19c is configured to interact with a corresponding fixation arrangement 12a, 12b, 12c in a locking manner in the mounted state shown in FIGS. 1, 2 and 7. The camera carrier 35 is mounted to the bracket 10 by moving the camera carrier 35 along an insertion direction 38 (see FIG. 1) until the pins 19a, 19b, 19c enter and get locked within the fixation arrangements 12a, 12b, 12c, which will be explained below.

In the embodiment of FIG. 1, a pin 19c is provided at a front 39 of the camera carrier 35 and positioned parallel to the insertion direction 38, which is called a longitudinal pin 19c interacting with a longitudinal fixation arrangements 12c, while a pin 19a, 19b is provided at every side 40a, 40b of the camera carrier 35 and oriented perpendicular to the insertion direction 38, which are called lateral pins 19a, 19b each interacting with a lateral fixation arrangement 12a, 12b. The number of lateral fixation arrangements 12a, 12b may be different from two and the number of longitudinal fixation arrangements 12c may be different from one.

Each fixation arrangement 12a, 12b, 12c comprises a holder 13a, 13b, 13c and a spring element 15 configured to lock a pin 19 in the respective holder 13a, 13b, 13c, which will be explained in detail below. The one or more holders 13a, 13b, 13c are preferably made of a thermoplastic material. The base part 11 and the one or more holders 13a, 13b, 13c can be made as a single integrated part of the same material, for example of a thermoplastic material.

In the following, a single fixation arrangement 12 interacting with a single pin 19 is described with respect to FIGS. 2 to 10. The fixation arrangement 12 of FIGS. 2 to 10 can advantageously be applied to the lateral fixation arrangements 12a, 12b of FIG. 1, but can also be applied with little modifications to the longitudinal fixation arrangement 12c of FIG. 1.

Figure 2:
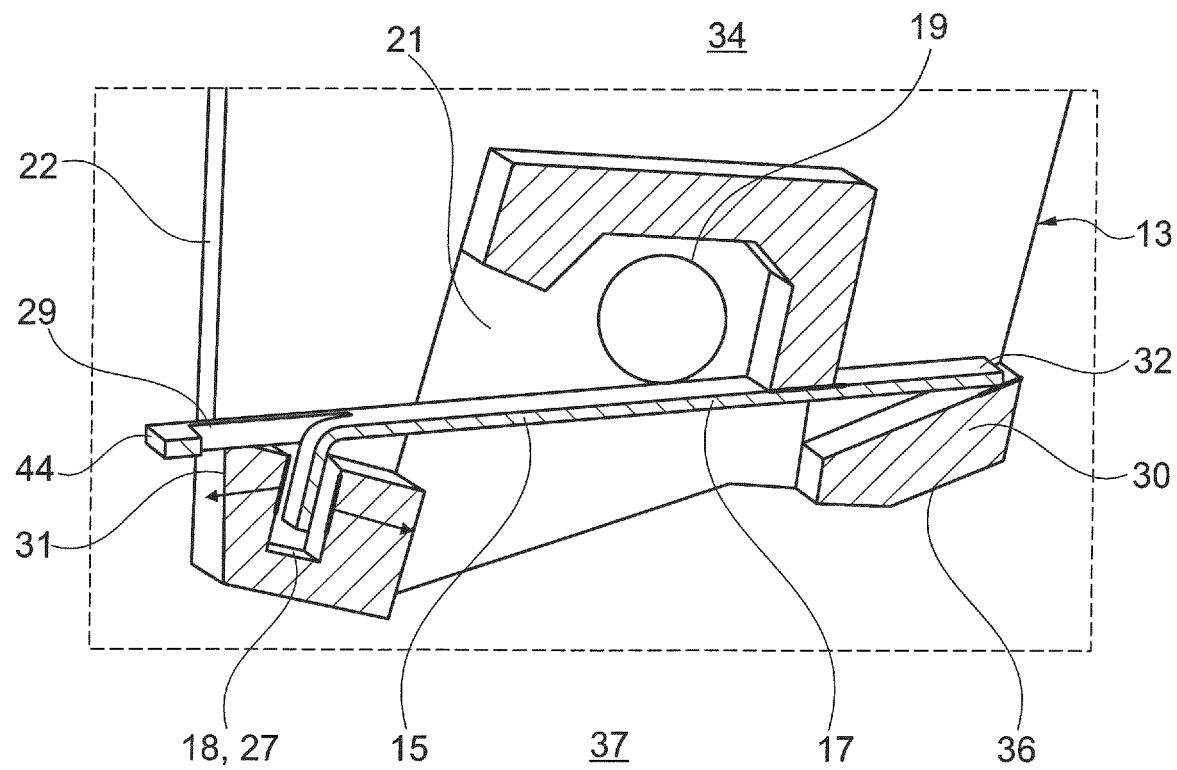
FIG. 2 shows a perspective sectional view on a fixation arrangement in a first embodiment.
Figure 3:
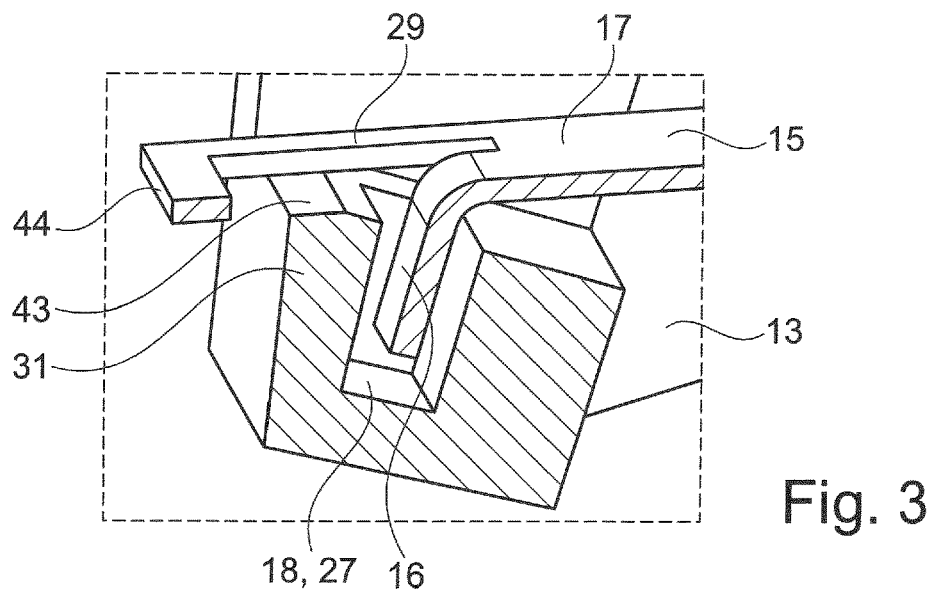
FIGS. 3-5 show perspective views on the fixation arrangement of FIG. 2 in the region of the angled leg of the spring element.
Figure 7:
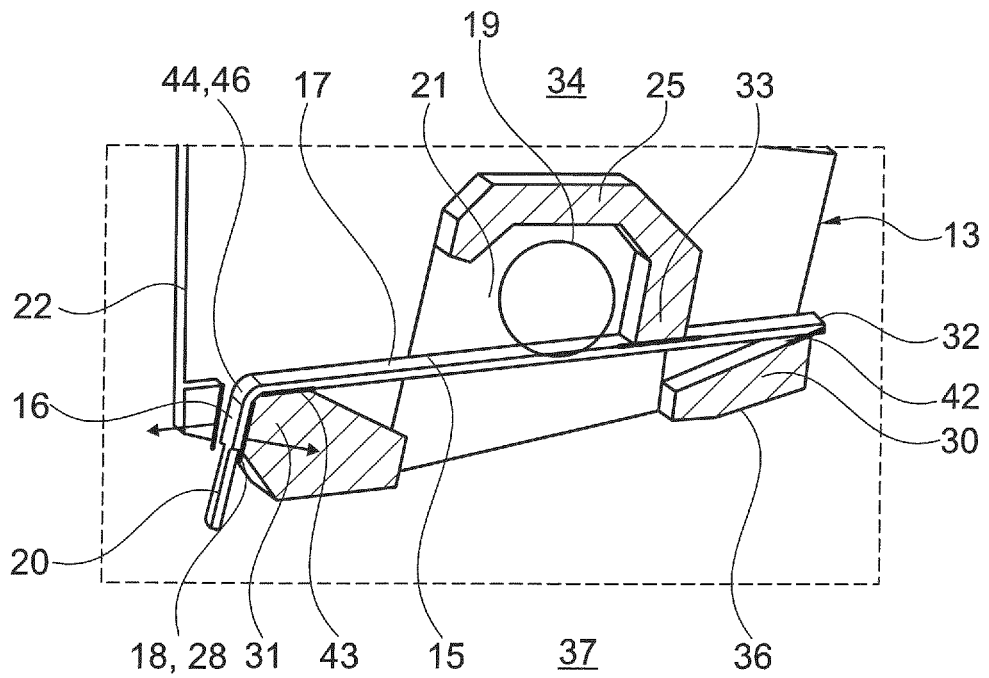
FIG. 7 shows a perspective sectional view on a fixation arrangement in a second embodiment.

As mentioned above, the fixation arrangement 12 comprises a holder 13 and a spring element 15 captively held in the holder 13, as shown in FIGS. 2 and 7. The holder 13, which may be made of a thermoplastic material, has a hollow space 21 in the inside for receiving the pin 19. The holder 13 comprises an insertion opening 22 allowing insertion of the pin 19 into the hollow space 21.

The spring element 15 comprises a preferably strip-shaped base element 17 and an angled leg 16 forming an angle a (see FIG. 11) of at least 95°, preferably at least 100°, for example 105°, and preferably in the range between 95° and 135°, more preferably between 100° and 120° relative to the base element 17, as can be seen in FIGS. 2, 3, 7, 8 and 10. The angle a is measured relative to the distal part of the base element 17 (beyond the joint edge 46), as shown in FIG. 11.

The base element 17 comprises a proximal end 44 arranged proximal to the insertion opening 22 in the mounted state, and a distal end 32 arranged distal to the insertion opening 22 and opposite the proximal end 44. The spring element 15 can be manufactured from a single piece of sheet metal or spring metal.

Figure 6:
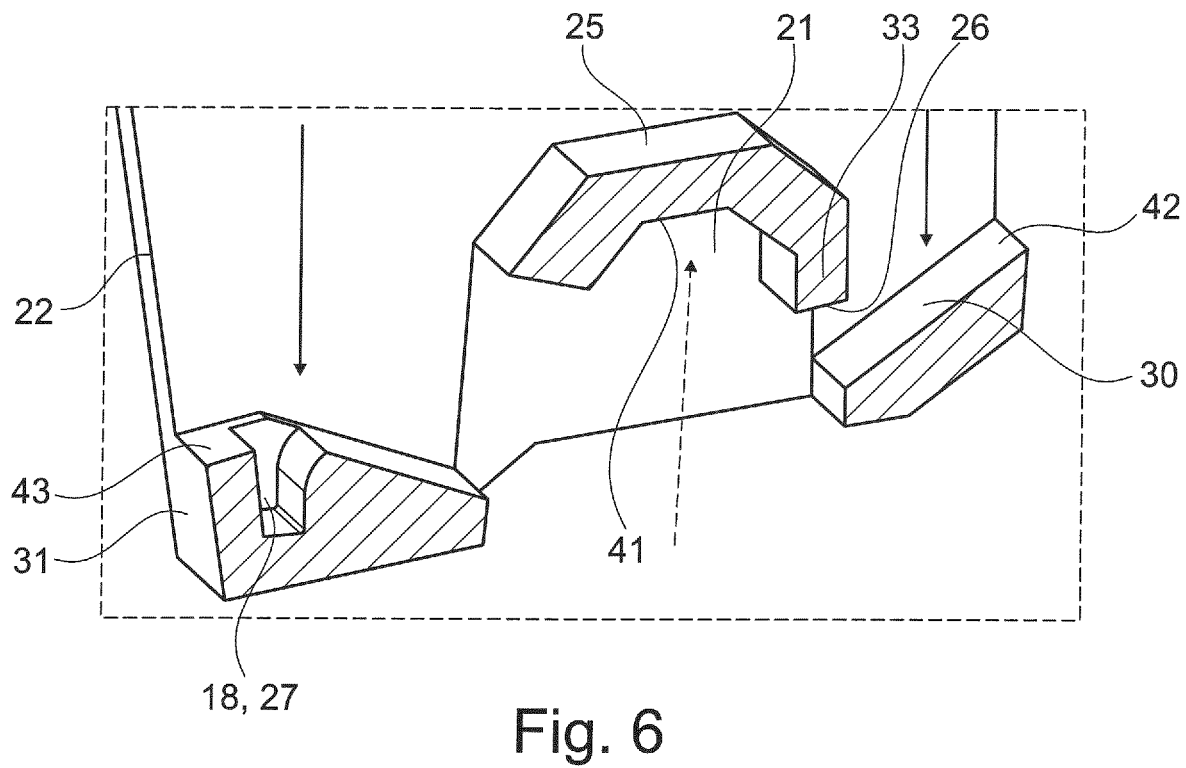
FIG. 6 shows a perspective sectional view on the holder of the fixation arrangement.

The holder 13 preferably comprises a recess 41 for receiving and holding the pin 19 in the locked state. The recess 41 is preferably formed by a counter element 25 which may be arc-shaped, V-shaped or U-shaped in a cross section as shown in FIG. 6.

The spring element 15 is captively held in the holder 13 in the following manner. The holder 13 preferably comprises one or more contact surfaces 26, 42, 43 holding the spring element 15 in the mounted state and preventing a movement perpendicular to the plane of the base element 17. At least one contact surface 26 can preferably be formed at the pin 19 facing side of the base element 17 in the mounted state. The contact surface 26 can for example be formed by a leg 33 of the counter element 25, see FIG. 6, preventing a movement of the base element 17 towards the recess 41. Furthermore, one or more contact surfaces or support surfaces 42, 43 can be formed at a pin 19 averted side (opposite side) of the base element 17, supporting the base element 17 from the pin 19 averted side, and preventing a movement of the base element 17 away from the recess 41. A first support surface 43 can be formed in a first support element 31 of the holder 13 provided in the region of the proximal end 44 of the base element 17. A second support surface 42 can be formed in a second support element 30 of the holder 13 provided in the region of the distal end 32 of the base element 17.

The holder 13 comprises a hole 18 configured to receive the angled leg 16 in the mounted state, as shown in FIGS. 2-5 and 7-10. In the mounted state, the angled leg 16 received in the hole 18 limits back-and-forth movement of the spring element 15 in both longitudinal directions 45 (see FIGS. 4 and 8) of the elongate base element 17.

The hole 18 can be a blind hole 27 as in the embodiment of FIGS. 2-6.

Alternatively, the hole 18 can be a through-hole 28 extending through the hole-forming part 31 of the holder 13 from the hollow space 21 to the outside of the holder 13, as in the embodiments of FIGS. 7-10. In this case, the angled leg preferably has a handling section 20 protruding over the surface of the holder 13 to the outside thereof. The handling section 20 can be formed on a side of the angled leg 16 and/or can have a smaller cross section 20 as compared to the rest of the angled leg 16, see FIG. 8-10. The handling section 20 can be useful in the mounting or demounting of the spring element 15.

The hole 18 can be arranged between the first contact surface 43 and the second contact surface 42 in the longitudinal direction, as in the embodiment of FIGS. 2-6.

Alternatively, the first contact surface 43 can be arranged between the hole 18 and the second contact surface 42 in the longitudinal direction, as in the embodiment of FIGS. 7-10.

In some embodiments, like in FIGS. 7-10, the joint edge 46 between the angled leg 16 and the base element 17 forms the proximal end 44 of the base element 17.

Figure 4:
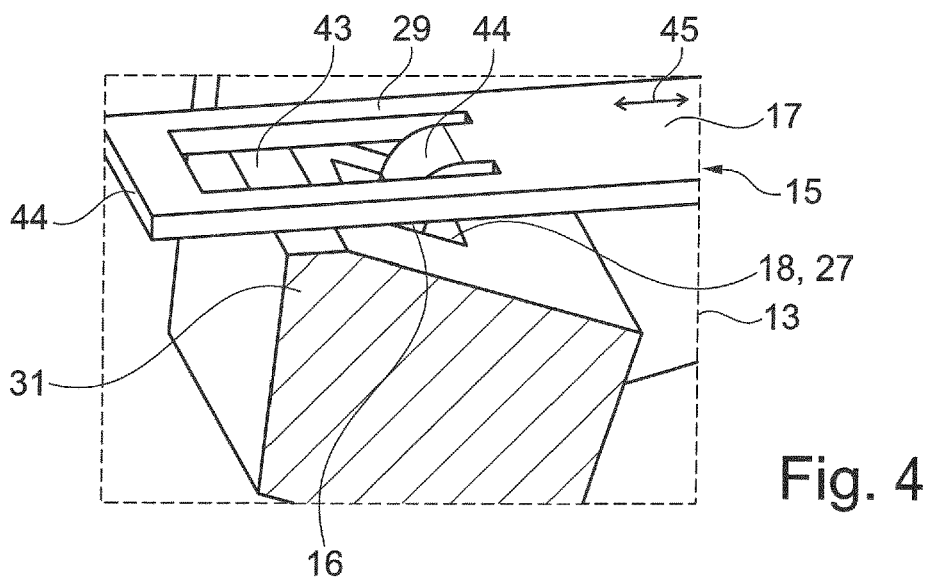
Figure 5:
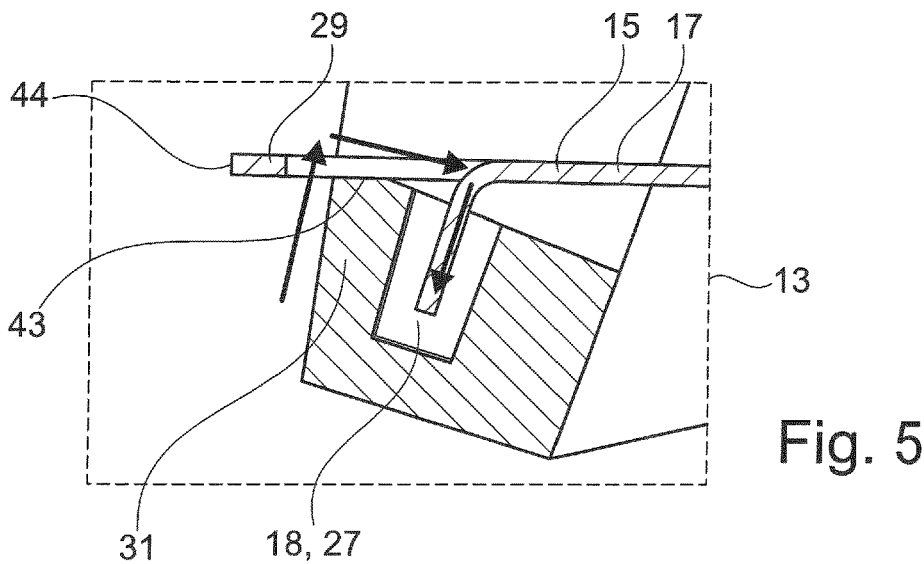

In other embodiments, like in FIGS. 2-5, the base element 17 comprises an extension 29 extending in the plane of the base element 17 and forming the first end 44 of the base element 17. The extension 29 may be U-shaped and surrounding the angled leg 16 as shown in FIG. 4. The extension 29 may have a different shape, for example be a simple leg at a side of the base element 17.

As follows from the above, the spring element 15 preferably is not fixedly connected to the holder 13, but removably held in position within the holder 13 without material joint between the spring element 15 and the holder 13. This facilitates replacement of the spring element 15 if necessary.

The hole-forming part 31 of the holder 13 can be the proximal support part 31 of the holder 13 as described above.

For mounting the camera carrier 35 to the bracket 10, each pin 19 is inserted into the hollow space 21 of the corresponding holder 13 and moved further along the insertion direction 28, whereby the pin 19 moves along the base element 17 until the pin 19 is fully received and thus locked in the recess 41 of the holder 13.

For dismounting the camera carrier 35 from the bracket 10, the camera carrier 35 is pulled in the direction opposite the insertion direction 38. An alternative way is to push the camera 14 or the camera carrier 35 towards the spring element 15, which bends or flexes the spring element 15 more and frees the pin 19 from being seated in the recess 41, and then dismount the camera carrier 35 in the direction opposite the insertion direction. As a consequence, each pin 19 is pulled out of the corresponding recess 41 and thus out of the holder 13 in order to disengage the camera carrier 35 from the bracket 10.

While the above description constitutes the preferred embodiment of the present invention, it will be appreciated that the invention is susceptible to modification, variation and change without departing from the proper scope and fair meaning of the accompanying claims.

The invention claimed is:

1. A bracket adapted to be mounted to a pane of a motor vehicle, the bracket comprising a base part and at least one fixation arrangement configured to fixate a camera carrier carrying at least one camera to the bracket, wherein each of the at least one fixation arrangement comprises a holder and a spring element configured to exert an elastic locking force on a pin of the camera carrier, wherein the spring element comprises a base element configured to be held in the holder, wherein the spring element comprises an angled leg in a region of a first end of the base element, the holder further comprises a hole configured to receive the angled leg in a mounted state, wherein in the mounted state the hole limits the movement of the angled leg and thus of a portion of the spring element that provides the elastic locking force on the pin in both longitudinal directions of the elongate base element.

2. The bracket as claimed in claim 1, further comprising the leg forms an angle of at least 95° relative to the base element.

3. The bracket as claimed in claim 1, wherein the holder comprises a counter element forming a recess for receiving the pin in the mounted stated.

4. The bracket as claimed in claim 3, further comprising the counter element is U-shaped.

5. The bracket as claimed in claim 3, further comprising the counter element forms a contact surface configured to contact the base element from a side opposite the hole.

6. The bracket as claimed in claim 1, wherein the holder further comprises a first support element configured to support the base element in a region of the first end of the base element.

7. The bracket as claimed in claim 6, further comprising the hole is formed in the first support element.

8. The bracket as claimed in claim 6, wherein the holder comprises a second support element configured to support the base element at a second end of the base element opposite the first end.

9. The bracket as claimed in claim 1, further comprising the first end of the base element is a proximal end arranged proximal to an insertion opening of the holder.

10. The bracket as claimed in claim 1, wherein the base element further comprises an extension extending in the plane of the base element and forming the first end.

11. The bracket as claimed in claim 10, further comprising the extension forms a U-shape, wherein the base of the U-shape forms the first end.

12. The bracket as claimed in claim 1, further comprising the hole is a blind hole.

13. The bracket as claimed in claim 1, further comprising the hole is a through-hole extending through the holder from an inner hollow space to an outside of the holder.

14. The bracket as claimed in claim 13, further comprising the angled leg comprises a handling section protruding to the outside of the holder through the through-hole.

\* \* \* \* \*